United States Patent [19]

Gilmore

[11] 4,280,547
[45] Jul. 28, 1981

[54] TIRE HAVING A FOLDED FABRIC REINFORCEMENT MEMBER AND A METHOD OF BUILDING SAME

[75] Inventor: Herbert O. Gilmore, Negley, Ohio

[73] Assignee: The Goodyear Tire & Rubber Company, Akron, OhioIO

[21] Appl. No.: 110,530

[22] Filed: Jan. 9, 1980

[51] Int. Cl.³ .................... B60C 9/04; B60C 9/18; B29H 17/20

[52] U.S. Cl. .................... 152/354 R; 152/361 R; 152/361 FP; 152/362 R; 156/128 N; 156/132; 156/133

[58] Field of Search .......... 152/354 R, 356 A, 357 R, 152/361 R, 361 FP, 362; 156/123 R, 128 R, 128 N, 132, 133

[56] References Cited

U.S. PATENT DOCUMENTS

| | | | |
|---|---|---|---|
| 1,581,743 | 4/1926 | Kearns et al. | 152/362 R |
| 2,700,998 | 2/1955 | Wallace | 156/117 |
| 3,161,220 | 12/1964 | Beckadolph | 152/361 R |
| 3,286,758 | 11/1966 | Svereckis et al. | 152/356 |
| 3,339,610 | 9/1967 | Fausti et al. | 152/354 |
| 3,467,161 | 9/1969 | Menell et al. | 152/354 |
| 3,563,296 | 2/1971 | Wells | 152/361 |
| 3,568,749 | 3/1971 | Menell et al. | 152/354 |
| 3,598,166 | 8/1971 | Wells | 152/361 |
| 3,789,899 | 2/1974 | Kobayashi | 152/362 R |
| 3,830,276 | 8/1974 | Smithkey | 152/361 FP |
| 4,063,987 | 12/1977 | Ilie | 156/417 |
| 4,120,339 | 10/1978 | Shichman | 152/354 RB |
| 4,210,189 | 7/1980 | Brown | 152/361 FP |

FOREIGN PATENT DOCUMENTS 1480943 3/1968 Fed. Rep. of Germany.
1480944 2/1969 Fed. Rep. of Germany.
1480929 3/1969 Fed. Rep. of Germany.

*Primary Examiner*—John E. Kittle
*Attorney, Agent, or Firm*—J. C. Simmons

[57] ABSTRACT

A folded fabric reinforcement member provides a plurality of reinforcing layers equivalent to at least one ply and at least one breaker of a conventional bias tire or at least one ply and at least one belt of a conventional radial or bias-belted tire. The cord angle of the belts is less than that of the ply and results from offsetting one outer zone of a fabric sheet from the other before impregnating the central zone thereof with elastomeric material and folding thereof to form a folded fabric reinforcement member.

25 Claims, 8 Drawing Figures

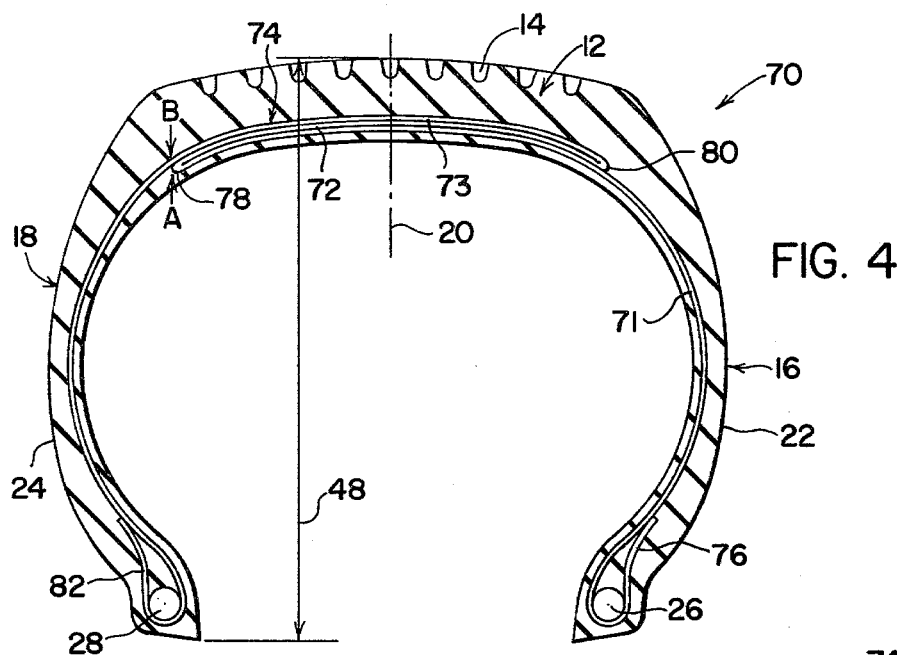
FIG. 4
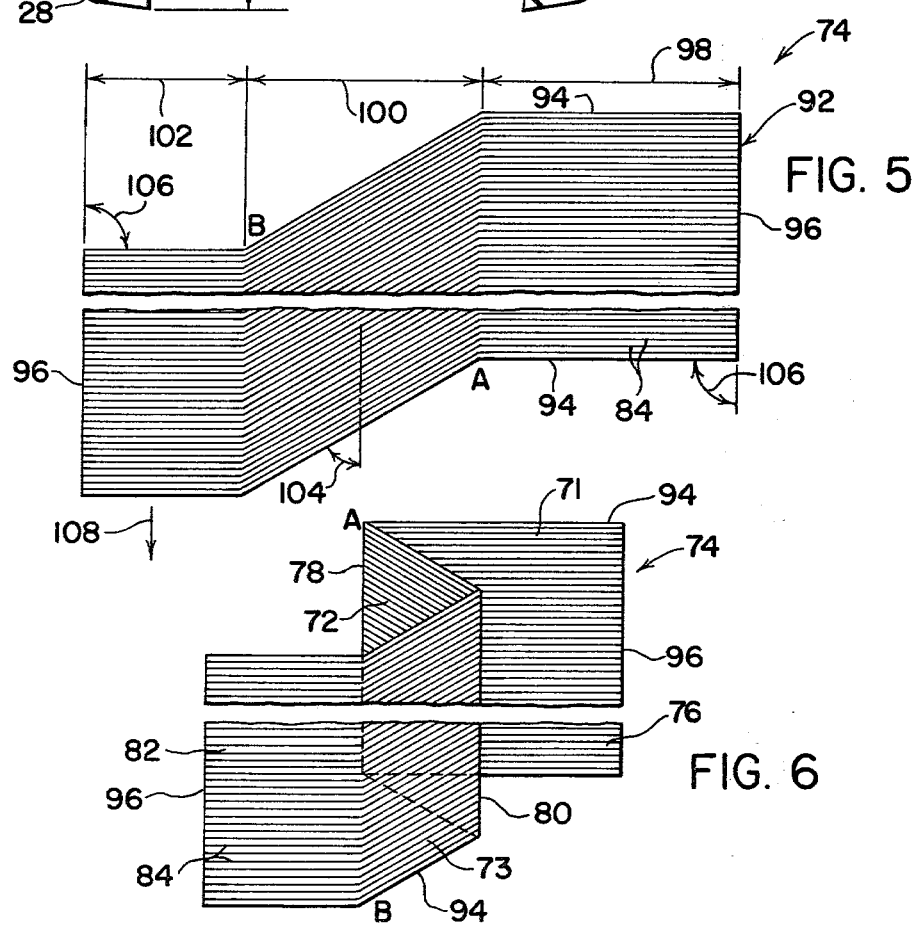
FIG. 5
FIG. 6

TIRE HAVING A FOLDED FABRIC REINFORCEMENT MEMBER AND A METHOD OF BUILDING SAME

This invention relates to tires and to methods of manufacturing same. More particularly, this invention relates to tires reinforced by a plurality of layers of reinforcing fabric which are provided by a single folded fabric reinforcement member.

Conventional bias tires have at least two plies of elastomer-impregnated fabric extending in a toroidal configuration between a pair of circular inextensible beads. Each ply includes a plurality of substantially parallel reinforcing cords which extend at a bias cord angle of about 28 to 40 degrees relative to the mid-circumferential plane of the tire, the cord angle of each ply being equal but opposite to the cord angles of adjacent plies. Each ply is a single piece of fabric. Two or more pieces of reinforcing material called "breakers" may also be provided in the crown area of the tire to further strengthen the tire in that area without adding unnecessary material in the sidewalls as would be the case if additional plies extending between the beads were provided.

Bias tires are conventionally built by assembling individual components about a cylindrical building drum to provide an uncured tire which resembles a barrel. This process may conventionally begin with the application of a thin layer of rubber compound called an inner-liner circumferentially around the drum. Then each ply is cut to the correct size and individually placed on the drum, one at a time. The plies are anchored to the beads at each side. Breakers may then be applied on the outer circumference of the plies. Finally, other components such as the tread and sidewalls may be applied. The uncured tire may then be expanded to a toroidal shape and vulcanized in a mold at high temperature and pressure.

Conventional radial tires have one or more plies of elastomer-impregnated fabric extending in a toroidal configuration between a pair of circular inextensible beads. The ply includes a plurality of cords which extend at a cord angle of substantially 90 degrees relative to the mid-circumferential plane of the tire. Two or more pieces of reinforcing material called "belts" are provided on the outer circumference of the ply in the crown region of the tire to provide strength in the circumferential direction. These belts usually have a bias cord angle of about 10 to 25 degrees relative to the mid-circumferential plane of the tire, the cord angle of one belt being equal but opposite to the cord angle of an adjacent belt.

Radial tires are conventionally built in two stages. In the first stage, the innerliner and ply are applied on a cylindrical drum and the ply anchored by the pair of beads on each side. The resulting cylindrical carcass is then expanded to near its cured toroidal configuration, after which the belts are applied. After sidewall and tread stock is applied, the uncured tire may be further expanded in a mold and vulcanized at high temperature and pressure.

Bias tires may be provided with belts in the crown area thereof for additional strength in the circumferential direction. A belt is distinguished from a breaker in that a breaker has substantially the same cord angle as the plies, while the cord angle of a belt is substantially less than the cord angle of the plies.

The process of applying each individual piece of fabric on a building drum is time-consuming. The output of a tire building factory may be limited by the number of tire building machines available and the time required to assemble the components on a drum. A process which could decrease this assembly time may result in an increase in the overall efficiency and maximum total output of the plant.

In both bias and radial tires, it is desirable to eliminate cut end-cords in the crown and shoulder regions. By cut end-cords, it is meant that the ends of cords of belts or breakers are exposed where they have been cut to provide fabric of a desired size. These exposed ends of the cords may cause a condition known as ply separation wherein an individual layer of fabric in the tire will tend to separate from other layers. If this condition occurs, it usually results in destruction of the tire.

It is also desirable to build radial tires in a single stage wherein the belts and other components are applied before expansion of the carcass to toroidal shape. But when the belts are applied as individual pieces of fabric in a single stage process, they tend to slip to one side and not remain centered in a conventional radial tire as it is expanded to toroidal shape. If this occurs, an unacceptable tire will usually result.

In accordance with at least one aspect of this invention, there is provided a tire which possesses one or more of the features described above as desirable.

Briefly, a single sheet of fabric is provided which is folded in such a manner as to provide a plurality of layers of reinforcing fabric which are equivalent to one or more plies and one or more breakers or belts in a conventional tire.

The utilization of a single sheet of folded fabric instead of several pieces of fabric substantially reduces the time required to build a tire at the building drum since a single step of applying a single sheet of fabric takes the place of individually applying several pieces of fabric. Although the fabric will have to be folded prior to its placement on the building drum, this can be done at a different location and separately from the tire building process at the drum. Thus, although the total amount of time required to build such a tire may not be reduced, the time required at a tire building drum is reduced, and this may result in an increase in overall plant efficiency and maximum total output.

Such a tire built from a single sheet of fabric does not have cut end-cords in the crown and shoulder areas of the tire since each side of a belt or breaker is defined by folds in the fabric rather than cuts. All of the cut end-cords will be disposed near a bead as will become apparent hereinafter.

A radial tire may be built in accordance with one aspect of this invention by impregnating with elastomeric material the outer portions of the fabric which will reinforce primarily the sidewalls, then skewing or offsetting one of these outer portions relative to the other in such a manner that the portions of the cords in the central portion of the fabric will assume an angle which will provide a desired bias cord angle such as 10 to 25 degrees in a cured tire. The central portion is then impregnated with elastomeric material after which the fabric is folded to provide layers equivalent to a ply and belts in a conventional radial tire.

Since the layers of fabric are integrally connected, the belt slippage problem which conventional radial tires have is eliminated or at least substantially reduced.

Therefore, improved dimensional control of the layers of fabric in the crown area is obtained.

The process of building such a tire is significantly simplified since only one tire-building stage is involved. This also results in a substantial reduction in the time required in the tire-building process at the drum.

Bias tires built in accordance with one aspect of this invention have been found to have significantly lower rolling resistance than conventionally built bias tires which are otherwise identical. In addition, low balance and lateral force variation data indicate a probable improvement in uniformity.

It is also believed that better angle uniformity and less angle distortion from storage and handling can be achieved in fabric prepared for building tires in accordance with this invention.

Therefore, in accordance with this invention, there is provided a tire for a vehicle comprising a first and a second bead and a crown portion extending circumferentially of the tire. The mid-circumferential plane of the tire divides the tire into a first side and a second side. A first sidewall and a second sidewall on the first and a second sides respectively extend from the crown portion in a direction toward the rotational axis of the tire to the first and second beads respectively. A single folded fabric reinforcement member extends circumferentially of the tire to provide a plurality of reinforcing layers. A first one of the reinforcing layers for reinforcing the sidewalls and crown portion extends from the first bead to the second bead in a path uninterrupted by folds where the reinforcement member is redirected into overlapping relation with the first reinforcing layer to provide a second one of the reinforcing layers. The second reinforcing layer extends from the second bead into the first side of the tire to provide reinforcement for the crown portion of the tire.

There is also provided in accordance with the invention a tire for a vehicle comprising a first and a second bead and a crown portion extending circumferentially of the tire. The mid-circumferential plane of the tire divides the tire into a first side and a second side. A first sidewall and a second sidewall on the first and second sides respectively extend from the crown portion in a direction toward the rotational axis of the tire to the first and second beads respectively. A folded fabric reinforcement member extends circumferentially of the tire to provide a plurality of reinforcing layers. A first one of the reinforcing layers extends from the first bead to the second bead where the reinforcement member is redirected into overlapping relation with the first reinforcing layer to provide a second one of the reinforcing layers. The second reinforcing layer extends from the second bead into the first side of the tire to a circumferentially extending junction where the reinforcement member is redirected into overlapping relation with the second reinforcing layer to provide a third one of the reinforcing layers. The junction of the second and third layers is spaced from the first bead a distance equal to at least half the section height of the tire. The third reinforcing layer extends from the junction of the second and third layers into the second side of the tire to another circumferentially extending junction where the reinforcement member is redirected into overlapping relation with the third reinforcing layer to provide a fourth of the reinforcing layers. The junction of the third and fourth layers is spaced from the second bead a distance equal to at least half the section height of the tire. The fourth reinforcing layer extends from the junction of the third and fourth layers to the first bead.

There is also provided in accordance with the invention a method of building a tire comprising:

(a) preparing a single elastomer-impregnated fabric sheet having a pair of ends and a plurality of generally parallel reinforcing cords extending parallel to said ends;

(b) folding said fabric sheet to form a reinforcement member having a pair of bead-engaging sides extending transversely to said ends and at least one crown reinforcing layer.

(c) applying said folded fabric reinforcement member in encircling relationship to a cylindrical tire building drum;

(d) joining said reinforcing layers together at said ends to form a generally cylindrical structure;

(e) setting beads on said fabric sheet adjacent said bead-engaging sides and folding said reinforcement member at least partially around said beads at said bead-engaging sides;

(f) applying tread and sidewall stock about said reinforcement member; and (g) shaping said generally cylindrical structure to toroidal form and vulcanizing said structure.

There is also provided in accordance with the invention a method of building a tire comprising:

(a) dividing the surface of a single fabric sheet having a plurality in generally parallel reinforcing cords extending between a pair of bead-engaging sides in the direction of the cords into a central and a pair of outer zones, each outer zone being adjacent said central zone;

(b) changing the angle of the cords in the central zone relative to the angle of the cords in the outer zones by moving the outer zones relative to one another while maintaining the angle of the cords in the outer zones;

(c) impregnating said fabric sheet with elastomeric material;

(d) folding said fabric sheet at least twice by redirecting said fabric sheet into overlapping relation with itself to provide reinforcing layers which have junctions extending in the direction of said bead-engaging sides, each of said reinforcing layers having a pair of ends extending transverse to said bead-engaging sides;

(e) forming the folded fabric sheet into cylindrical shape;

(f) joining the ends of each of said reinforcing layers to complete the cylindrical structure;

(g) setting beads on said fabric sheet adjacent said bead-engaging sides and folding said fabric sheet at least partially around said beads;

(h) applying tread and sidewall stock about said folded fabric sheet;

(i) shaping said generally cylindrical structure to toroidal form and vulcanizing said structure.

There is also provided in accordance with the invention a method of building a tire comprising:

(a) defining at least one central and a pair of outer zones of a reinforcing layer of a fabric sheet having a pair of ends, a pair of sides extending between the ends, and a plurality of generally parallel cords extending between said sides, each of said zones extending over the fabric sheet between said ends, said outer zones being adjacent said central zone, said reinforcing layer defining a pair of bead-engaging sides extending generally parallel to said sides of said fabric sheet;

(b) maintaining the angle which said cords form with said sides in each of said outer zones while moving one of said outer zones relative to the other of said outer zones in a direction generally parallel to said sides such that said cords form an angle relative to said sides in said central zone corresponding to a desired cord angle relative to the mid-circumferential plane of a tire built with said fabric sheet in said central zone of said reinforcing layer, said angle which said cords form with said sides in each of said outer zones corresponding to a desired cord angle relative to the mid-circumferential plane of a tire built with said fabric sheet in said respective outer zone;

(c) impregnating said fabric sheet with elastomeric material;

(d) forming said folded fabric sheet into cylindrical shape;

(e) joining said ends of said fabric sheet;

(f) setting beads on said fabric sheet adjacent said bead-engaging sides and folding said fabric sheet at least partially around said beads;

(g) applying tread and sidewall stock about said fabric sheet; and (h) shaping said generally cylindrical structure to toroidal form and vulcanizing said structure.

There is also provided in accordance with the invention a tire for a vehicle comprising a pair of beads and a crown portion extending circumferentially of the tire. A pair of sidewalls extend from the crown portion in a direction toward the rotational axis of the tire to the beads. At least two reinforcing layers of generally parallel reinforcing cords extend circumferentially about the tire and axially across the crown portion of the tire. The cords of the radially outer of the reinforcing layers extend from the mid-circumferential plane toward a first of the sidewalls at a first bias cord angle relative to the mid-circumferential plane and toward a second of the sidewalls at a second bias cord angle relative to the mid-circumferential plane. The first and second angles are substantially equal and extend in an opposed direction. The radially outer reinforcing layer extends through at least one of the sidewalls to one of the beads.

There is also provided in accordance with the invention a tire for a vehicle comprising a pair of beads and a crown portion extending circumferentially of the tire. A pair of sidewalls extend from the crown portion in a direction toward the rotational axis of the tire to the beads. A folded fabric reinforcement member extends circumferentially about the tire to provide at least two reinforcing layers of generally parallel reinforcing cords impregnated with elastomeric material. A first one of the reinforcing layers extends from a first of the beads to a second of the beads where the reinforcement member is redirected into overlapping relation with the first reinforcing layer to provide a second one of the reinforcing layers. The second reinforcing layer extends from the second bead to the first bead. The cords of the reinforcing layers extend at a bias cord angle relative to the mid-circumferential plane in the crown portion of the tire which is less than the cord angle at which the cords extend in the sidewalls of the tire. The bias cord angle in one of the reinforcing layers is equal and opposed to the bias cord angle in the other of the reinforcing layers.

In the drawings:

FIG. 4 is a view similar to that of FIG. 1 of a radial tire built in accordance with an aspect of this invention;

FIG. 5 is a plan view of the fabric sheet in reduced size, used to built the tire shown in FIG. 4 after the outer portions have been offset relative to each other;

FIG. 6 is a plan view of the fabric sheet shown in FIG. 5 folded to form a folded fabric reinforcement member;

DETAILED DESCRIPTION OF THE PREFERRED EMBODIMENT

Figure 1:
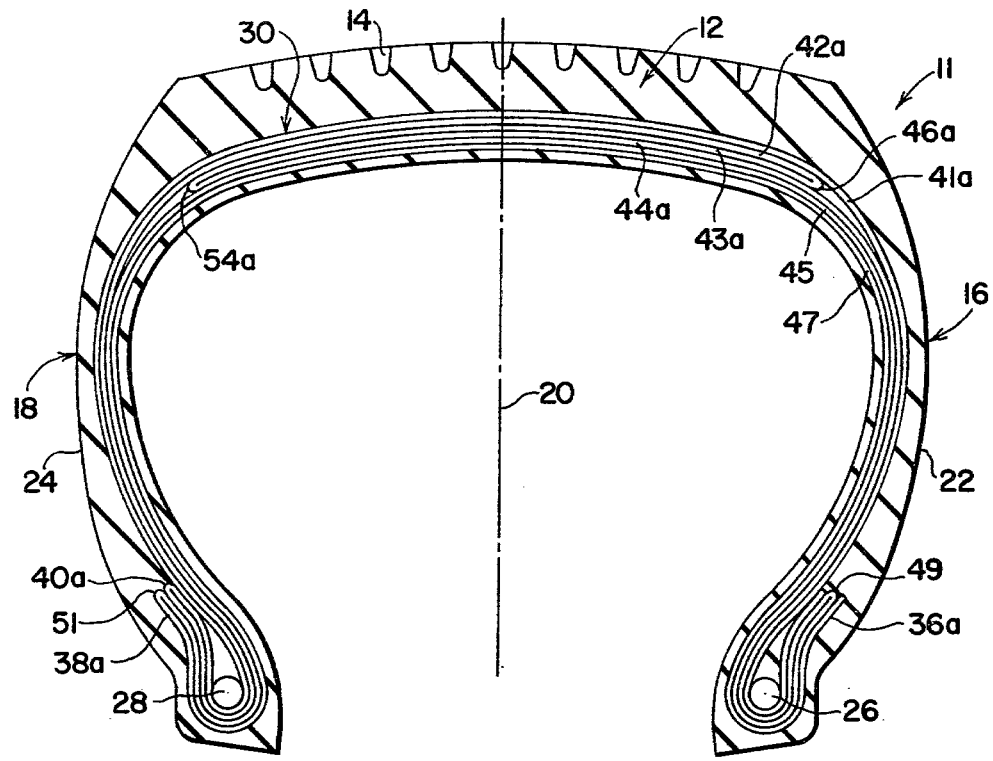
FIG. 1 is a schematic partial cross-sectional view taken in a radial plane of a tire built in accordance with one aspect of this invention.
Figure 2:
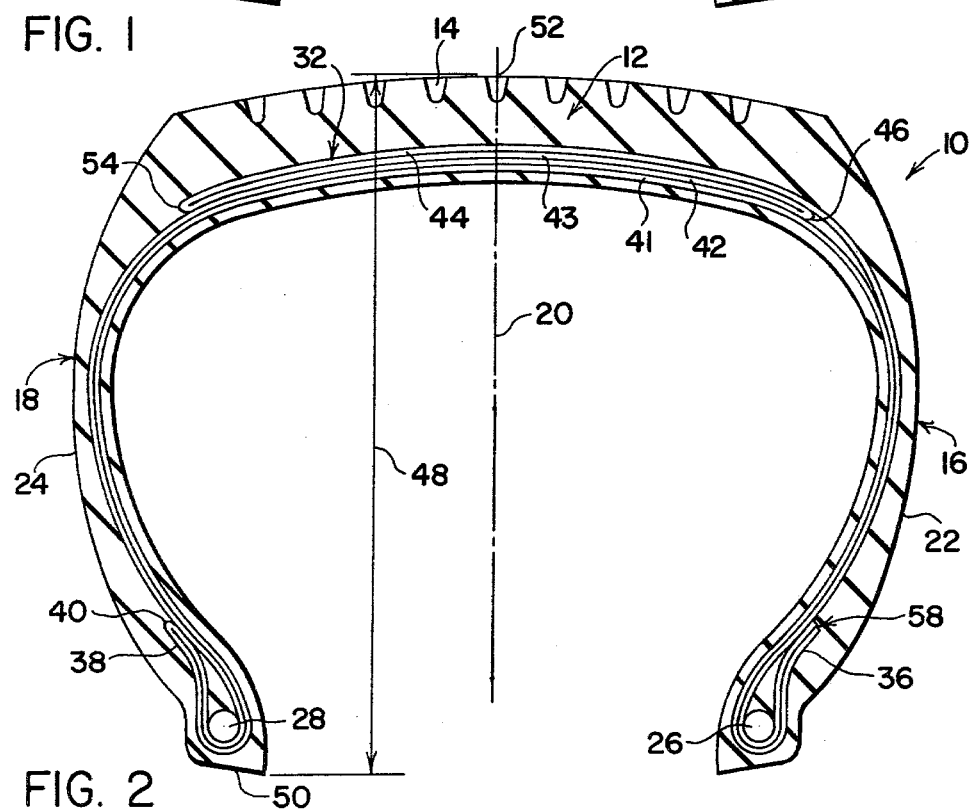
FIG. 2 is a view similar to that of FIG. 1 showing another tire built in accordance with an aspect of this invention.

Referring to the drawings and in particular to FIGS. 1, 2, and 4, there are shown tires 11, 10, and 70, respectively, of the pneumatic type. Each tire 10, 11, and 70 is a toroidal-shaped structure of reinforced elastomeric material which has a crown portion 12 extending circumferentially of the tire. A tread 14 is disposed circumferentially about the crown portion 12.

Each tire 10, 11, and 70 is divided into a first side 16 and a second side 18 by the mid-circumferential plane 20 of the tire. A "mid-circumferential" plane, as used in this specification and the claims, is a plane perpendicular to the axis of rotation of the tire which passes midway between the axially outermost points of the tire, exclusive of lettering or indicia.

The terms "axial" and "axially", as used herein, refer to a direction generally parallel to the axis of rotation of a tire. The terms "radial" and "radially", as used herein, refer to a direction generally perpendicular to the axis of rotation of the tire. A radial plane is one which contains the axis of rotation of a tire.

A first sidewall 22 and a second sidewall 24 on the first and second sides 16 and 18, respectively, extend radially inwardly from the crown portion 12 toward the rotational axis of the tire to first and second circular inextensible beads 26 and 28, respectively.

Each tire 10, 11, and 70 is reinforced by a single sheet of fabric which is folded to provide a plurality of reinforcing layers extending circumferentially about the tire. A folded fabric reinforcement member 30 reinforces the tire 11 of FIG. 1 and has six reinforcing layers which are equivalent to four plies and two breakers in a conventional tire.

The tire 10 of FIG. 2 has a folded fabric reinforcement member 32 which provides four reinforcing layers which are equivalent to two plies and two breakers in a conventional tire.

Figure 3:
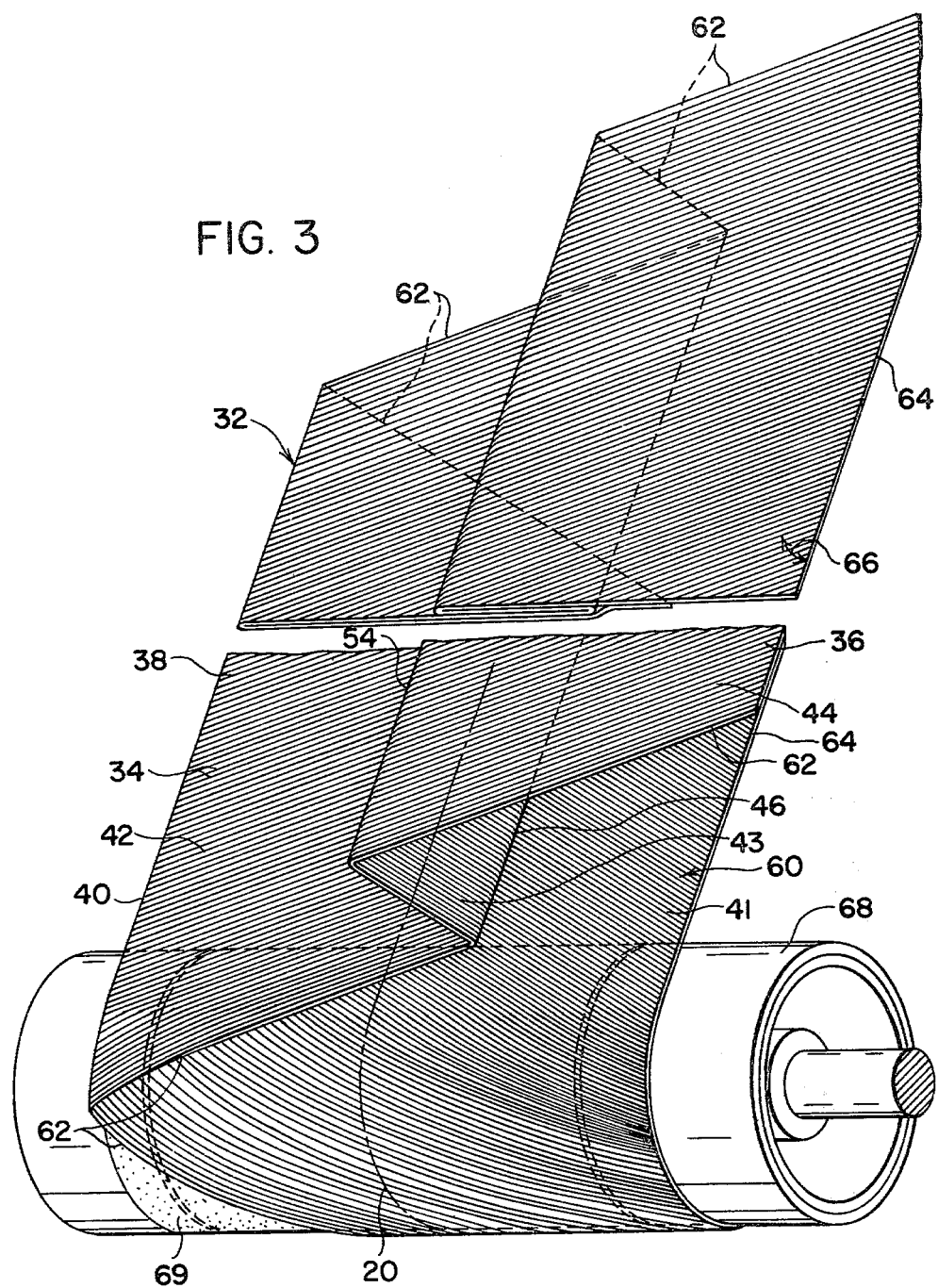
FIG. 3 is a perspective view showing a folded fabric reinforcement member reduced in size and partially applied on a building drum and used to build the tire shown in FIG. 2.

Referring to FIG. 3, the fabric reinforcement member 32 has a plurality of generally parallel cords 34 embedded in elastomeric material such as rubber or urethane. These cords 34 are made of any suitable material, such as, by way of example, nylon, rayon, polyester, or wire.

The folded fabric reinforcement member 32 has a pair of bead-engaging sides 36 and 38 for anchoring the reinforcement member 32 at the beads 26 and 28, respectively, by at least partially wrapping the reinforcement member 32 around the beads at the bead-engaging sides.

Referring to FIG. 2, a first reinforcing layer 41 extends from a first bead-engaging side 36 at the first bead 26 through the first sidewall 22, the crown portion 12, and the second sidewall 24 to a second bead-engaging side 38 at the second bead 28 where the reinforcement member 32 is redirected into overlapping relation with the first reinforcing layer 41 to provide a second reinforcing layer 42. The first and second reinforcing layers 41 and 42, respectively, converge along a line 40 at which the reinforcement member 32 is folded. This line 40 extends circumferentially about the tire 10 and may be called a junction between the first and second layers 41 and 42, respectively. As used herein, a junction is defined as a line in a reinforcement member along which the reinforcement member is folded to provide two overlapping reinforcing layers which meet at the line.

The second reinforcing layer 42 extends from the junction 40 of the first and second layers through the second sidewall 24, through at least part of the crown portion 12, and into the first side 16 of the tire 10 to a circumferentially extending junction 46 where the reinforcement member 32 is redirected into overlapping relation with the second reinforcing layer 42 to provide a third reinforcing layer 43.

In the preferred embodiment of this invention, second layer 42 extends axially across substantially the entire tread width of the tire 10 but does not extend into the first sidewall 22. For the purposes of this specification and the claims, "tread width" is defined by the axially outermost extremities of a tire which engage the ground in the footprint of the tire. A tire's footprint refers to the portion of a tire under normal inflation pressure and load which engages the ground during an infinitely small instant of time as the tire travels along the ground.

The junction 46 of second and third layers may be spaced closer to the mid-circumferential plane 20 or closer to the first bead 26 than is shown in FIG. 2. For instance, junction 46 may be spaced from the first bead 26 a distance equal to half the section height 48 of the tire 10.

As used herein, "section height" of a tire is defined as the distance along a line perpendicular to the axis of rotation of the tire between the radially innermost seating surface on the tire and the radially outermost point on the exterior surface of the tread when the tire is under normal inflation pressure and not under load. A tire seating surface, as shown at 50 on FIG. 2, is a surface which engages a rim for seating of the tire on the rim. The radially outermost point on the exterior surface of the tread is shown at 52 on FIG. 2. Normal inflation pressures and loads are those for which a tire is designed for normal operation.

The third reinforcing layer 43 extends from the junction 46 of the second and third layers across the crown portion 12 and into the second side 18 of the tire 10 to another circumferentially extending junction 54 where the reinforcement member 32 is redirected into overlapping relation with the third reinforcing layer 43 to provide a fourth reinforcing layer 44.

In the preferred embodiment of this invention, the third reinforcing layer 43 extends axially across substantially the entire tread width of the tire 10, but does not extend into the second sidewall 24. However, junction 54 may be spaced closer to the mid-circumferential plane 20 or closer to the second bead 28 than as shown in FIG. 2. For example, it may be spaced from the second bead 28 a distance equal to half the section height 48 of the tire 10.

The fourth reinforcing layer 44, extends from the junction 54 of the third and fourth layers through the crown portion 12, through the first sidewall 22, and to the first bead-engaging side 36 where the reinforcement member 32 may terminate as shown in FIG. 2, or where the reinforcement member may be redirected to provide additional reinforcing layers as, for example, the six layers of reinforcement member 30 of FIG. 1.

Reinforcement member 30 of FIG. 1 has reinforcing layers 41a, 42a, 43a, and 44a corresponding to reinforcing layers 41, 42, 43, and 44 respectively of tire 10 of FIG. 2. In addition, reinforcement member 30 has reinforcing layers 45 and 47 extending between the beads 26 and 28 and connected to adjacent layers at junctions 49 and 51 as shown.

The tires 10 and 11 shown in FIGS. 1 and 2 may be called bias tires. Conventional bias tires are those whose plies have a bias cord angle of generally 28 to 40 degrees at the mid-circumferential plane. "Cord angle" refers to the angle which the cords of a piece of reinforcing fabric make with and at the mid-circumferential plane of a tire. A conventional radial tire is one whose ply has a cord angle of substantially 90 degrees at the mid-circumferential plane and which has a pair of belts having a bias cord angle of about 10 to 25 degrees to provide strength in the circumferential direction. As the term is used herein, a "bias cord angle" is any cord angle other than one of substantially 90 degrees.

Each of the reinforcing layers of the folded fabric reinforcement member 32 has the same cord angle. The cord angle of each reinforcing layer is opposed to the cord angle of the adjacent reinforcing layers. In other words, the second and fourth layers 42 and 44, respectively, in FIG. 2, have cord angles which are equal but opposed to the cord angles of the first and third layers 41 and 43, respectively. The only cut endcords in tire 10 are at the first bead 26 as shown at 58 in FIG. 2.

The first reinforcing layer 41 may be disposed, in accordance with an aspect of this invention, radially outwardly of the other layers 42, 43, and 44 as shown in FIG. 1 instead of radially inwardly as shown in FIG. 2. In addition, a tire made in accordance with this invention may contain more than one folded fabric reinforcement member in which case an additional pair of beads may be provided for anchoring each such reinforcement member. Additional pieces of fabric or other reinforcing members may be disposed inwardly, outwardly, or between the reinforcing layers.

Building a tire 10 such as shown in FIG. 2 requires that a folded fabric reinforcement member 32 be prepared. This may be prepared by severing from elastomer-impregnated fabric having a plurality of parallel cords a fabric sheet 60, as shown in FIG. 3. This fabric sheet 60 is in the shape of a parallelogram having a pair of parallel ends 62 which extend generally parallel to the cords 34 and a pair of parallel sides 64. The angle 66 which the cords form relative to the sides 64 should be selected to provide the desired cord angle in tire 10 after pantographing of the cords as the tire 10 is expanded to toroidal form as occurs in a conventional bias tire. This angle 66 can be selected by applying known engineering principles.

The length of the sides 64 of fabric sheet 60 should be substantially equal to the circumference around the tire building drum 68 upon which the tire 10 is to be built to permit splicing of the ends 62 during building of the tire.

The length of the ends 62 of fabric sheet 60 should be such that the distance between the bead-engaging sides 36 and 38, when the fabric sheet 60 is folded to form the reinforcement member 32 as described hereafter, will be substantially equal to the distance between the beads 26 and 28 when the tire 10 is in cylindrical shape. This distance can be selected in the same manner as that for plies of a conventional bias tire is selected.

The fabric sheet 60 can be folded by the use of a jig or by hand to provide the reinforcement member 32 shown in FIG. 3.

The folded fabric reinforcement member 32 is applied in encircling relationship to the cylindrical tire building drum 68 as shown in FIG. 3. Beginning with the radially inner or first reinforcing layer 41, the ends 62 of each reinforcing layer are brought together and preferably aligned to lie substantially coextensive with each other, after which they are joined to form a generally cylindrical structure. Since the circumference of the radially inner layers will be slightly less than that of the radially outer layers, the radially inner layers are preferably lap-spliced to permit butt-splicing of the radially outer layer. An innerliner 69 may be applied to the building drum 68 prior to the application of the reinforcement member 32.

Utilizing methods commonly known in the tire building art, the circular inextensible beads 26 and 28 (not illustrated in FIG. 3) are set on the fabric reinforcement member 32 which has been wrapped about the building drum 68 so that the bead-engaging sides 36 and 38 extend slightly axially beyond the beads 26 and 28.

The portions of the reinforcement member 32 adjacent the bead-engaging sides 36 and 38 are then at least partially wrapped or folded around the beads 26 and 28 for engagement therewith.

Additional items such as stock to provide sidewalls 22 and 24, and tread 14 may then be applied to the cylindrical structure as is conventionally done in building tires. The structure is then shaped in a conventional manner to a generally toroidal form by moving the beads 26 and 28 axially inwardly toward each other and causing the axially central portion of the tire 10 between the beads 26 and 28 to expand radially outwardly to obtain the shapes illustrated in FIGS. 1 and 2 and in which form the tire is vulcanized.

A radial tire 70 built from a single sheet of fabric equivalent to one ply and two belts in a conventional tire is shown in FIG. 4. The cord angle of the fabric varies to provide a cord angle of substantially 90 degrees in the sidewalls of the tire and a bias cord angle in the crown area.

A first reinforcing layer 71 of the single sheet of fabric or folded fabric reinforcement member 74 extends at a cord angle of substantially 90 degrees from a first bead-engaging side 76 at a first bead 26 through a first sidewall 22 through at least part of the crown portion 12, and into a second side 18 of the tire 70 to a circumferentially extending junction 78 where the reinforcement member 74 is redirected into overlapping relation with the first reinforcing layer 71 to provide a second reinforcing layer 72. As shown, the first layer 71 preferably extends axially across substantially the entire tread width of the tire 70, but does not extend into the second sidewall 24. However, junction 78 may be spaced closer to the mid-circumferential plane 20 or closer to a second bead 28 than is shown. For instance, junction 78 may be spaced from the second bead 28 a distance equal to half the section height 48 of the tire 70.

The second reinforcing layer 72 extends at a bias cord angle from the junction 78 of the first and second layers across the crown portion 12 and into the first side 16 of the tire 70 to another circumferentially extending junction 80 where the reinforcement member 74 is redirected into overlapping relation with the second reinforcing layer 72 to provide a third reinforcing layer 73. Preferably, as shown, the second reinforcing layer 72 extends axially across substantially the entire tread width of the tire 70, but does not extend into the first sidewall 22. However, junction 80 may be spaced closer to the mid-circumferential plane 20 or closer to the first bead 26 than is shown in FIG. 4. For example, it may be spaced from the first bead 26 a distance equal to half the section height 48 of the tire 70.

The third reinforcing layer 73 extends at a bias cord angle from the junction 80 of the second and third layers through the crown portion 12, and at a cord angle of substantially 90 degrees through the second sidewall 24, and to the second bead-engaging side 82 at the second bead 28 where reinforcement member 74 may terminate as shown in FIG. 4 or where the reinforcement member may be redirected to provide additional reinforcing layers. In addition, if desired, additional reinforcing pieces may be provided between the first and third reinforcing layers 71 and 73, respectively, or separate inserts of reinforcing material may be disposed in the tire 70 either radially inwardly or radially outwardly of any of the reinforcing layers.

A plurality of reinforcing cords 84 (FIG. 5) of any suitable material such as, by way of example only, nylon, rayon, polyester, or wire, extend between bead-engaging sides 76 and 82, respectively. A portion of the reinforcement member 74 includes the overlapped parts of reinforcing layers 72 and 73 whose cords 84 extend at a bias cord angle relative to the mid-circumferential plane 20 of the tire 70 and lie between points A and B in FIG. 4, herein called a "bias fabric portion". The remaining portions of the reinforcement member 74 whose cords 84 extend at a cord angle relative to the mid-circumferential plane 20 of the tire 70 of substantially 90 degrees will be called herein "radial fabric portions".

FIG. 4 shows the bias fabric portion as comprising all of the second reinforcing layer 72 and the part of the third reinforcing layer 73 which extends across the tread width of the tire 10. This invention is not limited to this embodiment, however. For example, the bias fabric portion may comprise all of the second reinforcing layer 72 and the part of the first reinforcing layer 71 which extends across the tread width of the tire. The tire 70 may have two bias fabric portions separated by a radial fabric portion, one of the bias fabric portions being part of the first reinforcing layer and the other being part of the third reinforcing layer. These bias fabric portions may extend into the sidewalls.

Building a radial tire 70 such as that shown in FIG. 4 requires that a folded fabric reinforcement member 74, as shown in FIG. 6, be prepared. A fabric sheet 92, as shown in FIG. 5, is obtained. The fabric sheet is substantially rectangular and has a pair of parallel ends 94 and a pair of parallel sides 96. A plurality of reinforcing cords 84 extend generally parallel to the ends 94 and between the sides 96. The parallel sides 96 correspond to the bead-engaging sides 76 and 82 of the tire 70 of FIG. 4.

The length of the sides 96 of the fabric sheet 92 should be substantially equal to the circumference around the tire building drum upon which the tire is to be built. The length of the ends 94 should be such that the distance between the bead-engaging sides 76 and 82 when the fabric sheet 92 is folded as shown in FIG. 6 and described hereinafter to form the reinforcement member 74 will be substantially equal to the distance between the beads 26 and 28 when the tire 70 is in cylindrical shape.

For the purposes of this specification and the claims, the fabric sheet 92 is divided into zones including a central zone 100 lying between A and B in FIGS. 4, 5, and 6, and extending over the fabric sheet in a direction parallel to the sides 96. The central zone 100 provides the bias fabric portion of the tire of FIG. 4. A pair of outer zones 98 and 102 lie on each side of the central zone 100 and provide the radial fabric portions of the tire 70 of FIG. 4. This invention is not limited to a fabric sheet having just one central zone and two outer zones. For example, five such zones may be defined in a fabric sheet in accordance with an aspect of this invention to provide two bias fabric portions separated by a radial fabric portion and a pair of radial fabric portions outwardly of the bias fabric portions.

The outer zones 98 and 102 are impregnated with elastomeric material such as rubber or urethane so as to maintain an angle 106, as shown in FIG. 5, corresponding to a 90-degree cord angle for the portions of the cords 84 located in the outer zones 98 and 102. The central zone 100 is left free of elastomeric material to permit the portions of the cords in the central zone 100 to assume a different angle 104 corresponding to the desired cord angle of the bias fabric portion of the tire 70 of FIG. 4.

The fabric sheet 92 is skewed or reshaped from rectangular shape (not shown) so that it assumes the shape shown in FIG. 5 whereby one outer zone 102 is off-set relative to the other 98 by moving one of the outer zones 102 relative to the other in a direction generally parallel to the sides 96 as shown by arrows 108. Since the portions of the cords 84 in the central zone 100 are not impregnated with elastomeric material, these cord portions will be moved angularly to assume bias angle 104. This angle 104 will correspond to the cord angle of the bias fabric portion when the tire 70 is in cylindrical form. Therefore, this angle should be selected to provide the desired cord angle in the bias fabric portion after pantographing has occurred and the tire 70 is in its final toroidal shape. This angle 104 can be selected by applying known engineering principles.

The central zone 100 of the fabric sheet 92 is impregnated with elastomeric material to provide the fabric sheet as shown in FIG. 6.

A primary reason for impregnating the outer zones 98 and 102 with elastomeric material before offsetting one outer zone relative to the other is to provide a means of maintaining the angle 106 so that it does not change during the movement of one outer zone relative to the other. If another means is provided for holding the outer zones 98 and 102 so that angle 106 does not change during such movement, then the outer zones 98 and 102 need not be impregnated with elastomeric material until after such movement.

The fabric sheet 92 is then folded at least twice at about the central zone 100 to form the folded fabric reinforcement member 74 shown in FIG. 6 by redirecting the fabric sheet 92 into overlapping relation with itself to provide the reinforcing layers 71, 72, and 73 shown in FIG. 4 which have junctions 78 and 80 extending generally parallel to the sides 96.

The folded fabric reinforcement member 74 is applied in encircling relationship to a cylindrical tire building drum, as previously described for the bias tire, and the ends 94 are joined to form a generally cylindrical structure. An innerliner may be applied to the drum prior to the application of the reinforcement member.

Utilizing methods commonly known in the tire building art, the circular inextensible beads 26 and 28 (not illustrated in FIGS. 5 and 6) are set on the reinforcement member 74 which has been wrapped about the building drum so that the bead-engaging sides 76 and 82, respectively, extend slightly axially beyond the beads 26 and 28.

The portions of the reinforcement member 74 adjacent the bead-engaging sides 76 and 82 are then at least partially wrapped or folded around the beads 26 and 28 for engagement therewith.

Additional items such as stock to provide sidewalls 22 and 24, and tread 14 may then be applied to the cylindrical structure as is conventionally done in building tires. The structure is then shaped in a conventional manner to a generally toroidal form by moving the beads 26 and 28 axially inwardly toward each other and causing the axially central portion of the tire 70 between the beads 26 and 28 to expand radially outwardly to the shape illustrated in FIG. 4 in which form the tire is vulcanized.

The building of a tire in accordance with this invention does not require that a reinforcement member be applied to a building drum before joining of the ends. If desired, the ends may be joined to form what is conventionally called in the tire building art a "band" before application of the reinforcement member to a building drum.

Figure 7:
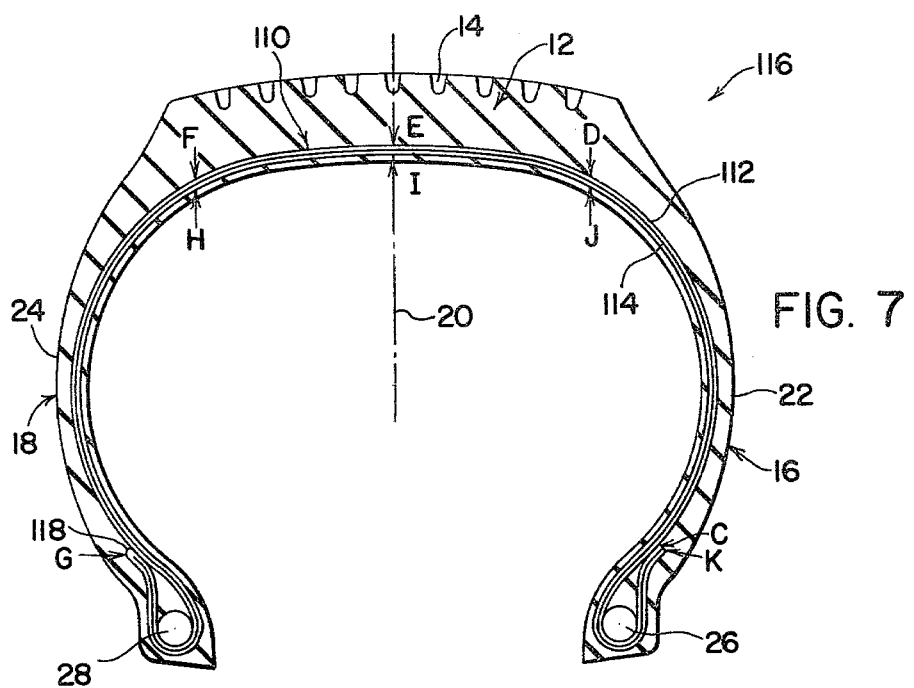
FIG. 7 is a view similar to that of FIG. 1 of a tire built in accordance with an aspect of this invention.

FIG. 7 shows an alternative embodiment of an aspect of this invention wherein a folded fabric reinforcement member 110 includes, but is not limited to, two reinforcing layers 112 and 114 of generally parallel reinforcing cords 115. These reinforcing layers extend circumferentially about the tire 116 and between the beads 26 and 28. The layers 112 and 114 are joined at a second bead 28 at circumferentially extending junction 118 at G. In the crown portion 12 (between D and F and between H and J), the cords 115 extend at bias cord angles relative to mid-circumferential plane 20, the bias cord angle in one of the reinforcing layers being equal and opposed to the bias cord angle in the other of the reinforcing layers in the crown portion 12. In the sidewalls 22 and 24 of the tire, the cords 115 of both reinforcing layers 112 and 114 extend at a cord angle of substantially 90 degrees, which results in a tire equivalent to a conventional radial tire.

Figure 8:
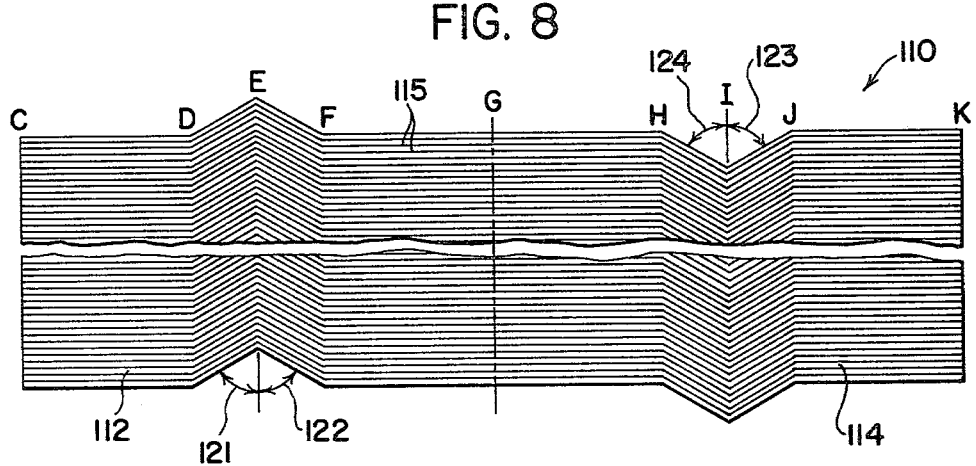
FIG. 8 is a view similar to that of FIG. 5 of one embodiment of a fabric sheet used to build the tire shown in FIG. 7.

FIG. 8 shows a particular embodiment of the reinforcement member 110 of FIG. 7 which should minimize ply steer effects. Ply steer refers to the tendency of a tire to steer in a particular direction. The direction of the cords in the radially outermost layer or layers of reinforcing cords in the crown portion of a tire is believed to be a major factor contributing to ply steer effects. Letters C through K in FIGS. 7 and 8 depict the same points along reinforcement member 110. The cords 115 of the radially outer reinforcing layer 112 extend from the mid-circumferential plane 20 at E oward the first sidewall 22 (between E and D) at a first cord angle 121 and toward the second sidewall 24 (between E and F) at a second cord angle 122 which is substantially equal to and extends in an opposed direction to the first cord angle 121. The cords 115 of the radially inner reinforcing layer 114 extend from the mid-circumferential plane 20 at I toward the first sidewall 22 (between I and J) at a third cord angle 123 which is substantially equal to and extends in an opposed direction to the first cord angle 121. The cords 115 of the radially inner reinforcing layer 114 further extend from the mid-circumferential plane 20 at I toward the second sidewall 24 (between I and H) at a fourth cord angle 124 which is substantially equal to and extends in an opposed direction to the second and third cord angles 122 and 123, respectively. Since the cords 115 in tire 116 are symmetrical with respect to the mid-circumferential plane 20, it is believed that ply steer effects will be substantially minimized with such a tire.

It is thus readily apparent that reinforcement members in accordance with this invention can be provided in a variety of configurations including changes in cord angle, locations of junctions, and number of reinforcing layers. It should thus be understood that the scope of this invention should not be limited to the configurations shown.

While certain representative embodiments and details have been shown for the purpose of illustrating the invention, it will be apparent to those skilled in the art that various changes and modifications may be made therein without departing from the spirit or scope of the invention.

What is claimed is:

1. A tire for a vehicle comprising a first and a second bead, a crown portion extending circumferentially of the tire, the mid-circumferential plane of the tire dividing the tire into a first side and a second side, a first sidewall and a second sidewall on said first and second sides respectively extending from said crown portion in a direction toward the rotational axis of the tire to said first and second beads respectively and a single folded fabric reinforcement member extending circumferentially of the tire to provide a plurality of reinforcing layers; a first one of said reinforcing layers for reinforcing the sidewalls and crown portion extending from said first bead to said second bead in a path uninterrupted by folds where said reinforcement member is redirected into overlapping relation with said first reinforcing layer to provide a second one of said reinforcing layers; said second reinforcing layer extending from said second bead into said first side of the tire to provide reinforcement for the crown portion of the tire.

2. A tire according to claim 1, wherein said reinforcement member is redirected into overlapping relation with said second reinforcing layer to provide a third one of said reinforcing layers.

3. A tire according to claim 2, wherein said third reinforcing layer forms a circumferentially extending junction with said second layer and extends into said second side of the tire to another circumferentially extending junction where said reinforcement member is redirected into overlapping relation with said third reinforcing layer to provide a fourth of said reinforcing layers.

4. A tire according to claim 3 wherein, said fourth reinforcing layer extends from said junction of said third and fourth layers to said first bead.

5. A tire according to any one of claims 3 through 4, wherein said junction between said second and third layers is spaced from said first bead a distance equal to at least half the section height of the tire, and said junction between said third and fourth layers is spaced from said second bead a distance equal to at least half the section height of the tire.

6. A tire according to claim 1, wherein said reinforcing layers have a bias cord angle relative to the mid-circumferential plane of the tire.

7. A tire for a vehicle comprising a first and a second bead, a crown portion extending circumferentially of the tire, the mid-circumferential plane of the tire dividing the tire into a first side and a second side, a first sidewall and a second sidewall on said first and second sides respectively extending from said crown portion in a direction toward the rotational axis of the tire to said first and second beads respectively and a folded fabric reinforcement member extending circumferentially of the tire to provide a plurality of reinforcing layers; a first one of said reinforcing layers extending from said first bead to said second bead where said reinforcement member is redirected into overlapping relation with said first reinforcing layer to provide a second one of said reinforcing layers; said second reinforcing layer extending from said second bead into said first side of the tire to a circumferentially extending junction where said reinforcement member is redirected into overlapping relation with said second reinforcing layer to provide a third one of said reinforcing layers, said junction of said second and third layers being spaced from said first bead a distance equal to at least half the section height of the tire; said third reinforcing layer extending from said junction of said second and third layers into said second side of the tire to another circumferentially extending junction where said reinforcement member is redirected into overlapping relation with said third reinforcing layer to provide a fourth of said reinforcing layers, said junction of said third and fourth layers being spaced from said second bead a distance equal to at least half the section height of the tire; said fourth reinforcing layer extending from said junction of said third and fourth layers to said first bead.

8. A tire according to claim 7, wherein said reinforcing layers have a bias cord angle relative to the mid-circumferential plane of the tire.

9. A method of building a tire comprising:
(a) preparing a single elastomer-impregnated fabric sheet having a pair of ends and a plurality of generally parallel reinforcing cords extending parallel to said ends;
(b) folding said fabric sheet to form a reinforcement member having a pair of bead-engaging sides extending transversely to said ends and at least two layers of reinforcing cords extending from at least one of said bead-engaging sides to provide reinforcement in at least the crown portion of the tire;
(c) applying said folded fabric reinforcement member in encircling relationship to a cylindrical tire building drum;
(d) joining said reinforcing layers together at said ends to form a generally cylindrical structure;
(e) setting beads on said fabric sheet adjacent said bead-engaging sides and folding said reinforcement member at least partially around said beads at said bead-engaging sides;
(f) applying tread and sidewall stock about said reinforcement member; and (g) shaping said generally cylindrical structure to toroidal form and vulcanizing said structure.

10. A method according to claim 9, wherein said fabric sheet is in the shape of a parallelogram, the angle which said cords form with one of said bead-engaging sides being selected to provide a desired cord angle of said cords in the tire when the tire is in toroidal shape.

11. A structure providing a plurality of reinforcing layers for a tire having a pair of sidewalls extending from the crown portion in a direction toward the rotational axis of the tire to the beads, said structure comprising a folded fabric reinforcement member of elastomer-impregnated material which, in the extended condition, has a pair of ends and a pair of sides of such length as to permit said ends to be joined during building of a tire, and having a plurality of reinforcing cords disposed parallel to said ends, said reinforcement member being folded to provide a first and a second bead-engaging side extending transversely to said ends for engaging said first and second beads, respectively, and a plurality of reinforcing layers;

a first one of said reinforcing layers extending from said first bead-engaging side to said second bead-engaging side where said reinforcement member is redirected into overlapping relation with said first reinforcing layer to provide a second of said reinforcing layers;

said second reinforcing layer extending from said second bead-engaging side toward said first bead-engaging side a distance of at least half of the distance between said first and second bead-engaging sides to a junction parallel to said first and second bead-engaging sides where said reinforcement member is redirected into overlapping relation with said second reinforcing layer to provide a third of said reinforcing layers, said junction of said second and third layers being spaced from said first bead-engaging side a distance such that said junction of said second and third layers of said tire is spaced from said first bead a distance equal to at least half the section height of the tire;

said third reinforcing layer extending from said junction of said second and third layers toward said second bead-engaging side to another junction parallel to said first and second bead-engaging sides where said reinforcement member is redirected into overlapping relation with said third reinforcing layer to provide a fourth of said reinforcing layers, said junction of said third and fourth layers being spaced from said second bead-engaging side a distance such that said junction of said third and fourth layers of said tire is spaced from said second bead a distance equal to at least half the section height of the tire, the distance between said junction of said third and fourth layers and said second bead-engaging side being less than the distance between said junction of said third and fourth layers and said first bead-engaging side;

said fourth reinforcing layer extending from said junction of said third and fourth layers to said first bead-engaging side.

12. A structure according to claim 11, wherein the angle which said cords form with said bead-engaging sides is such as to provide a desired bias cord angle of said cords in a tire built with the structure when the tire is toroidal shape.

13. A method of building a tire comprising:

(a) dividing the surface of a single fabric sheet having a plurality of generally parallel reinforcing cords extending between a pair of bead-engaging sides in the direction of the cords into a central and a pair of outer zones, each outer zone being adjacent said central zone;

(b) changing the angle of the cords in the central zone relative to the angle of the cords in the outer zones by moving the outer zones relative to one another while maintaining the angle of the cords in the outer zones;

(c) impregnating said fabric sheet with elastomeric material;

(d) folding said fabric sheet at least twice by redirecting said fabric sheet into overlapping relation with itself to provide reinforcing layers which have junctions extending in the direction of said bead-engaging sides, each of said reinforcing layers having a pair of ends extending transverse to said bead-engaging sides;

(e) forming the folded fabric sheet into cylindrical shape;

(f) joining the ends of each of said reinforcing layers to complete the cylindrical structure;

(g) setting beads on said fabric sheet adjacent said bead-engaging sides and folding said fabric sheet at least partially around said beads;

(h) applying tread and sidewall stock about said folded fabric sheet;

(i) shaping said generally cylindrical structure to toroidal form and vulcanizing said structure.

14. A method according to claim 13, wherein said angle of said cords in at least one of said outer zones is maintained by impregnating said outer zone with elastomeric material such as to hold the cords in fixed relationship in said outer zone, said central zone being impregnated with elastomeric material after said movement of one of said outer zones relative to the other.

15. A method according to claim 13, wherein said cords extend at an angle of substantially 90 degrees relative to said sides in said outer zones to provide a cord angle of said cords in the sidewalls of a tire of substantially 90 degrees relative to the mid-circumferential plane of the tire, and at an angle in said central zone after said movement of one outer zone relative to the other which is selected to provide a desired bias cord angle in two overlapping reinforcing layers in the crown area of a tire wherein the cord angle of one reinforcing layer is equal and opposed to the cord angle of the other reinforcing layer.

16. A method according to claim 13, wherein said ends of each of said reinforcing layers are joined before application of the folded fabric sheet on a tire building drum.

17. A tire built by the method claimed in claim 13.

18. A method of building a tire comprising:

(a) defining at least one central and a pair of outer zones of a reinforcing layer of a fabric sheet having a pair of ends, a pair of sides extending between the ends, and a plurality of generally parallel cords extending between said sides, each of said zones extending over the fabric sheet between said ends, said outer zones being adjacent said central zone, said reinforcing layer defining a pair of bead-engaging sides extending generally parallel to said sides of said fabric sheet;

(b) maintaining the angle which said cords form with said sides in each of said outer zones while moving ...e of said outer zones relative to the other of said outer zones in a direction generally parallel to said sides such that said cords form an angle relative to said sides in said central zone corresponding to a desired cord angle relative to the mid-circumferential plane of a tire built with said fabric sheet in said central zone of said reinforcing layer, said angle which said cords form with said sides in each of said outer zones corresponding to a desired cord angle relative to the mid-circumferential plane of a tire built with said fabric sheet in said respective outer zone;

(c) impregnating said fabric sheet with elastomeric material;

(d) forming said fabric sheet in cylindrical shape;

(e) joining said ends of said fabric sheet;

(f) setting beads on said fabric sheet adjacent said bead-engaging sides and folding said fabric sheet at least partially around said beads;

(g) applying tread and sidewall stock about said fabric sheet; and (h) shaping said generally cylindrical structure to toroidal form and vulcanizing said structure.

19. A method according to claim 18, wherein said angle of said cords in at least one of said outer zones is maintained by impregnating said outer zone with elastomeric material such as to hold the cords in fixed relationship in said outer zone, said central zone being impregnated with elastomeric material after said movement of one of said outer zones relative to the other.

20. A method according to claim 18, wherein said ends of said fabric sheet are joined before application of the fabric sheet on a tire building drum.

21. A tire for a vehicle comprising a pair of beads, a crown portion extending circumferentially of the tire, a pair of sidewalls extending from said crown portion in a direction toward the rotational axis of the tire to said beads, and at least two reinforcing layers of generally parallel reinforcing cords, each of said reinforcing layers extending circumferentially about the tire and axially across the crown portion of the tire, the cords of the radially outer of said reinforcing layers extending from the mid-circumferential plane toward a first of said sidewalls at a first bias cord angle relative to the mid-circumferential plane and toward a second of said sidewalls at a second bias cord angle relative to the mid-circumferential plane, said first and second angles being substantially equal and extending in an opposed direction, said radially outer reinforcing layer extending through at least one of said sidewalls to one of said beads.

22. A tire according to claim 21, wherein the cords of a second of said reinforcing layers extend from the mid-circumferential plane toward said first sidewall at a third bias cord angle relative to the mid-circumferential plane and toward said second sidewall at a fourth bias cord angle relative to the mid-circumferential plane, said third and fourth angles being substantially equal and extending in an opposed direction, said first and third angles being substantially equal and extending in an opposed direction, said second and fourth angles being substantially equal and extending in an opposed direction, said second reinforcing layer extending at least through the other of said sidewalls to the other of said beads.

23. A tire according to claim 21, wherein said cords extend at an angle relative to the mid-circumferential plane of substantially 90 degrees in the sidewalls of the tire.

24. A tire for a vehicle comprising a pair of beads, a crown portion extending circumferentially of the tire, a pair of sidewalls extending from the crown portion in a direction toward the rotational axis of the tire to the beads, and a folded fabric reinforcement member extending circumferentially about the tire to provide at least two reinforcing layers of generally parallel reinforcing cords impregnated with elastomeric material, a first one of said reinforcing layers extending from a first of the beads to a second of the beads where said reinforcement member is redirected into overlapping relation with said first reinforcing layer to provide a second one of said reinforcing layers, said second reinforcing layer extending from the second bead to the first bead, the cords of said reinforcing layers extending at a bias cord angle relative to the mid-circumferential plane in the crown portion of the tire which is less than the cord angle at which the cords extend in the sidewalls of the tire, said bias cord angle in one of said reinforcing layers being equal and opposed to said bias cord angle in the other of said reinforcing layers.

25. A tire according to claim 24, wherein said cords extend at a cord angle relative to the mid-circumferential plane of substantially 90 degrees in the sidewalls of the tire.

* * * * *